United States Patent Office 2,978,121
Patented Apr. 4, 1961

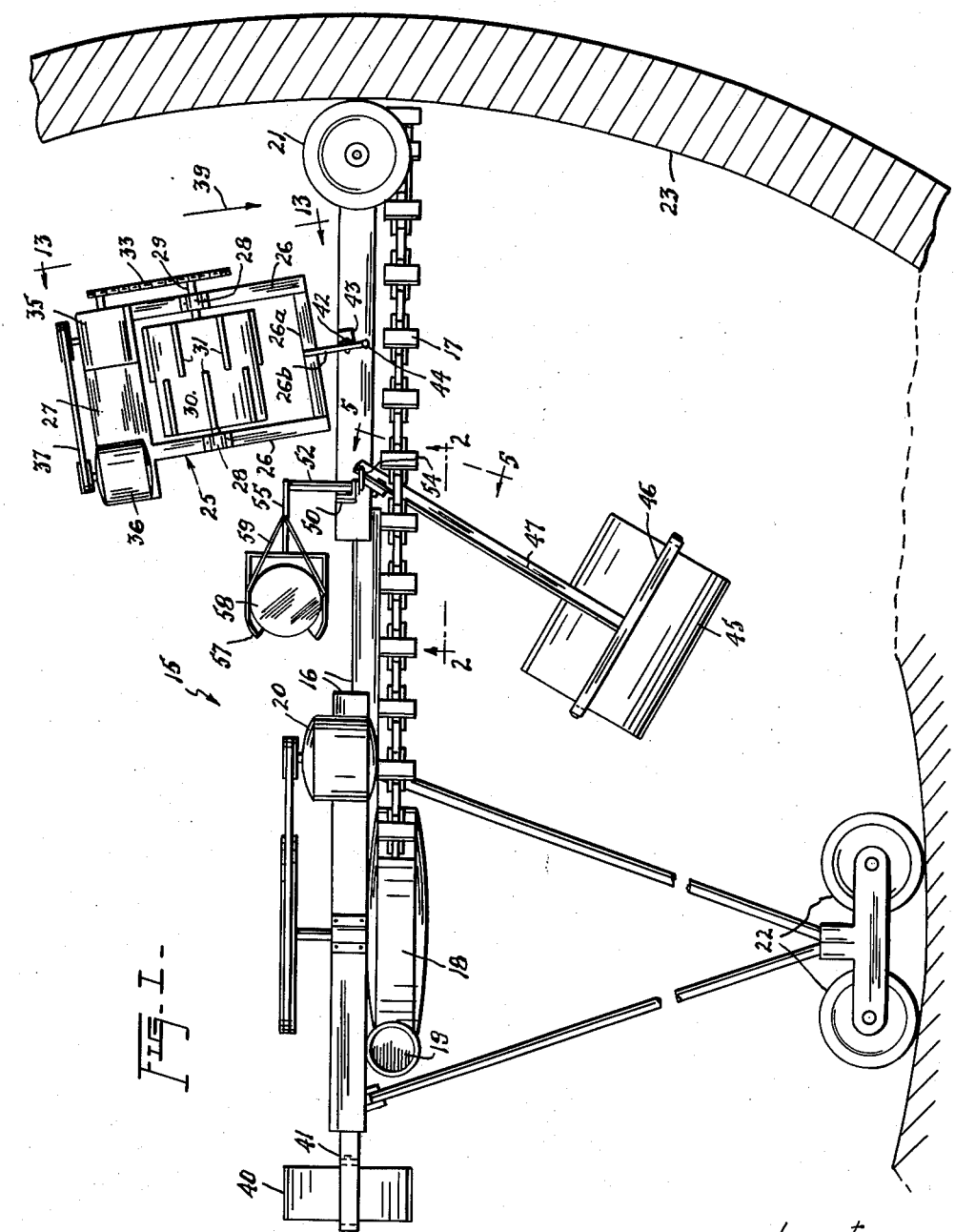

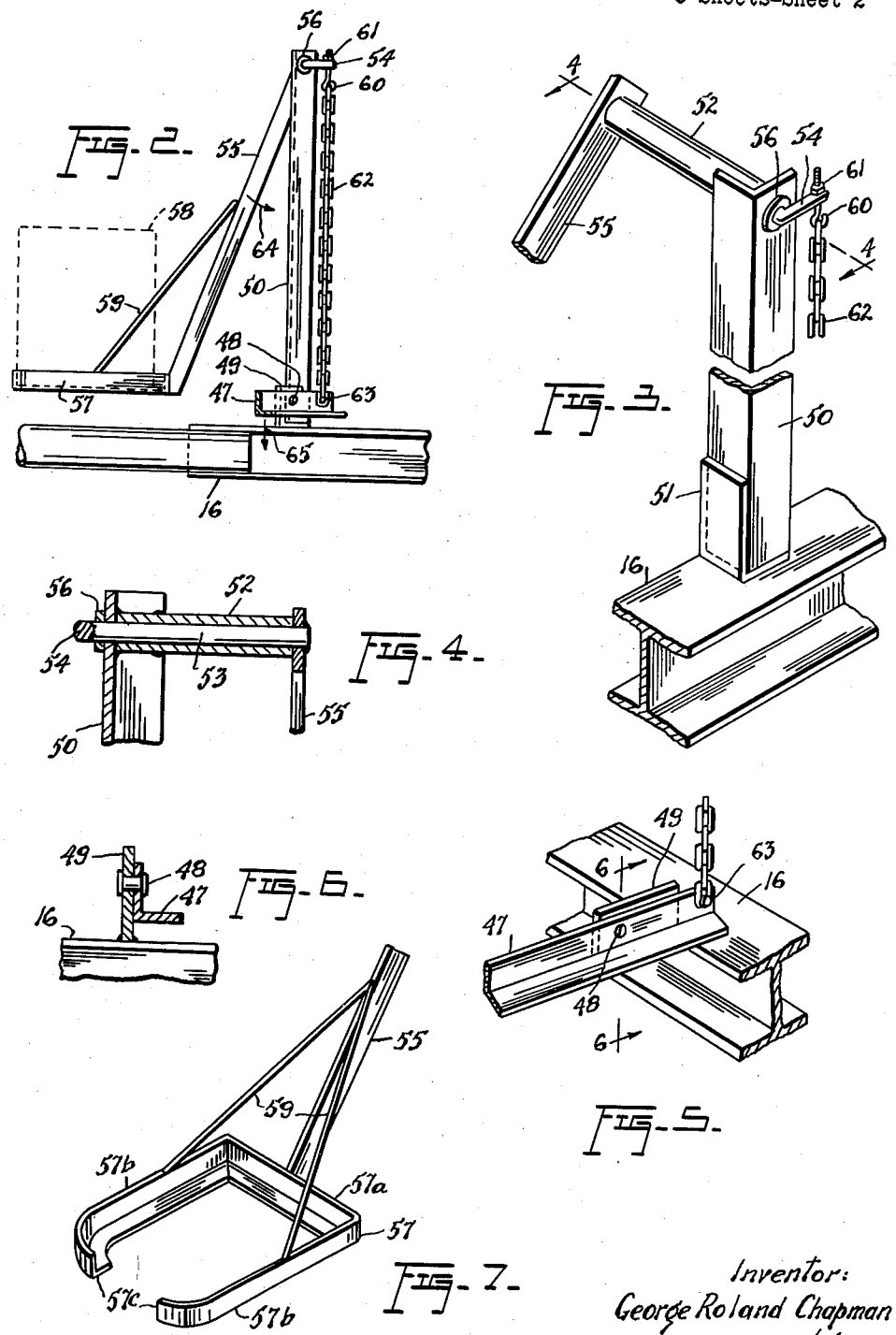

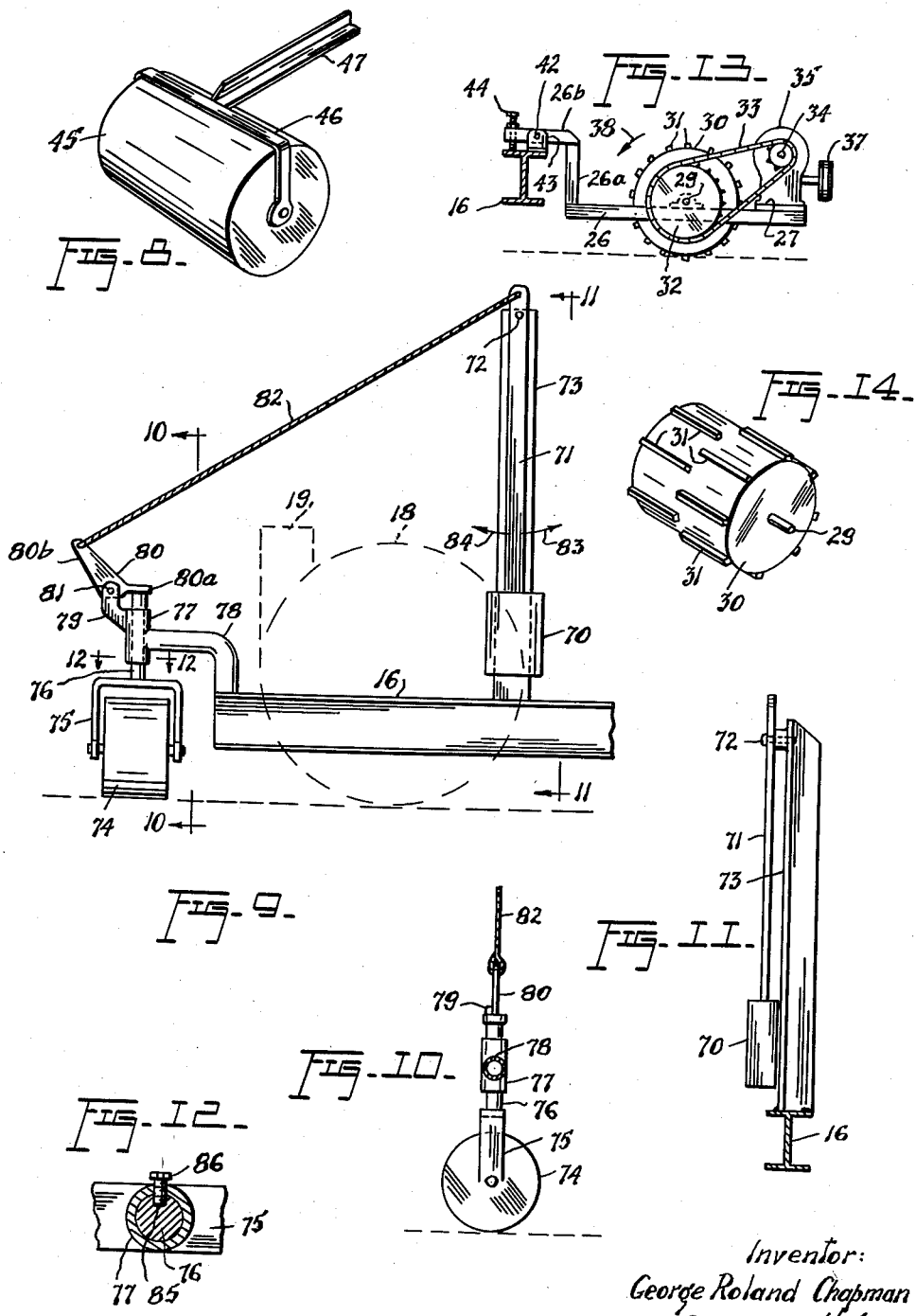

2,978,121

SILAGE HANDLING MACHINE

George Roland Chapman, Stafford Road, Palmyra, N.Y.

Filed Feb. 21, 1957, Ser. No. 641,615

10 Claims. (Cl. 214—17)

This invention relates to new and useful improvements in material handling apparatus, and in particular the invention concerns itself with a machine for handling silage. As such, the invention may be employed in a silo for discharging material therefrom, although it is to be understood that it may also be used out of doors, wherever picking-up and delivery of silage or other similar material is to be effected.

Generally speaking, the present invention is similar to that disclosed in my co-pending patent application serial No. 510,907, filed May 25, 1955; now Patent No. 2,788,-247, of which this application is a continuation-in-part.

The principal object of the present invention is to provide efficient gravity actuated self-leveling means independent of any power means for the elongated travelling frame of the machine, so that the same is automatically sustained in a substantially horizontal position notwithstanding any irregularity or unevenness of the bed of silage on which the machine rests, it being understood that maintenance of the machine frame in a horizontal position is desirable and necessary in order to assure uniform picking-up of the silage along the path of travel of the machine.

An important feature of the invention, therefore, resides in the provision and arrangement of the self-leveling means, the same being responsive to a gravity actuated weight which is movably mounted on the machine frame.

Another important feature of the invention resides in the provision of novel means for propelling the travelling frame along the silage bed.

Other objects, features and advantages of the invention will be apparent from the following description taken in conjunction with the accompanying drawings wherein for illustrative purposes certain preferred embodiments of the invention are shown, and wherein:

Figure 1 is a top plan view of a silage handling machine in accordance with the invention, also showing in section portions of a silo wall;

Figure 2 is a fragmentary side elevational view of the self-leveling mechanism, this view being taken substantially in the plane of the line 2—2 in Figure 1 with the coveyor chain omitted for sake of clarity;

Figure 3 is a fragmentary perspective view of certain elements of the self-leveling mechanism;

Figure 4 is a sectional detail, taken substantially in the plane of the line 4—4 in Figure 3;

Figure 5 is a fragmentary perspective view of certain other elements of the self-leveling mechanism, this view being taken substantially in the plane of the line 5—5 in Figure 1;

Figure 6 is a sectional detail, taken substantially in the plane of the line 6—6 in Figure 5;

Figure 7 is a fragmentary perspective view of the weight supporting arm and bracket of the self-leveling mechanism;

Figure 8 is a fragmentary perspective view of the wheel or roller together with its supporting yoke and lever;

Figure 9 is a fragmentary side elevational view of the machine embodying a modified form of the self-leveling means;

Figure 10 is a vertical sectional view, taken substantially in the plane of the line 10—10 in Figure 9;

Figure 11 is a vertical sectional view, taken substantially in the plane of the line 11—11 in Figure 9;

Figure 12 is a sectional detail, taken substantially in the plane of the line 12—12 in Figure 9;

Figure 13 is an elevational view of the propelling mechanism, this view being taken substantially in the plane of the line 13—13 in Figure 1; and Figure 14 is a perspective view of the traction roller.

Referring now to the accompanying drawings in detail, particularly to Figures 1–8 and 13, 14 thereof, the silage handling machine in accordance with the invention is designated generally by the reference numeral 15 and, for most part, is similar to that disclosed in my aforementioned Patent No. 2,788,247. For the sake of simplicity of illustration and description herein, many of the details of construction of the machine, particularly the silage conveyor and delivery mechanism, have been omitted in the present disclosure which concerns itself primarily with the self-leveling mechanism, it being understood that the various other structural details of the machine are substantially the same as in my earlier application, so that a detailed description and illustration thereof at this point are unnecessary.

However, it may be briefly stated that the machine comprises a horizontally elongated frame 16 on which is mounted a chain conveyor 17 to effect the picking-up and delivery of silage on which the machine rests to a housing 18 from which the silage is discharged by centrifugal force through an outlet duct 19, the mechanism within the housing 18 being actuated by a motor 20 which also drives the conveyor 17. Suitable guide rollers or wheels 21, 22 are provided on the frame for guiding the machine in a circular path in a silo, such rollers or wheels engaging the silo wall indicated at 23. As will be noted, the conveyor 17 is maintained at all times in parallel relation to the elongated frame 16 throughout the operation of the self-leveling mechanism. In other words, tilting of the frame likewise tilts the conveyor as a whole, while restoration of the frame to the horizontal position restores the conveyor to its initial position.

The propelling means in accordance with the present invention are designated generally by the reference numeral 25 and comprise a pair of spaced parallel bars, preferably angle bars, 26 which are provided with a yoke 26a having a tongue 26b pivoted by a pin 42 to a bracket 43 secured to the frame 16. An adjusting screw 44 is provided on the tongue 26b to engage the frame 16, whereby the bars 26 may be raised or lowered with respect to the frame. The bars 26 extend laterally from the frame and are provided at their outer ends with a platform 27. A pair of bearings 28 are provided on intermediate portions of the bars 26 and have journalled therein an axle 29 to which is secured a travelling wheel or roller 30. The latter is provided on the periphery thereof with two sets of circumferentially spaced traction lugs 31 which are elongated and extend longitudinally of the roller from the opposite ends thereof for approximately one-half the roller length. The lugs in the two sets are preferably circumferentially staggered, as is best shown in Figure 14.

The roller 30 is disposed between the bars 26 and the axle 29 projects through one of the bearings 28 to carry a relatively large sprocket wheel 32 which is connected by an endless chain 33 to a relatively small sprocket wheel 34 of a suitable conventional speed reduction unit 35 mounted on the platform 27. A motor 36, also mounted on the the platform 27, is operatively connected by an endless belt drive 37 to the speed reduction unit 35, so that when the motor is energized, the traction roller 30 is driven in the direction of the arrow 38 and the propelling mechanism 25 pushes the machine in its circular path in the silo, as indicated by the arrow 39 in Figure 1. The traction lugs 31 of the roller 30 engage the silage to afford positive propulsion, it being noted that the propelling mechanism 25 is attached to the frame 16 adjacent the outer end thereof, that is, adjacent the silo wall 23, while the housing 18 is disposed substantially at the center of the silo. The inner end of the frame 16 adjacent the housing 18 is supported on the silage bed by a suitable roller 40 mounted in a yoke 41 secured to the frame.

As will be understood, the surface of the silage is often uneven or irregular, and if the machine were permitted to travel thereon in an ordinary manner, the silage would not be uniformly picked-up thereby and moreover, the picking-up action of the machine would have a tendency to accentuate the unevenness of the silage bed. To eliminate this condition, self-leveling means independent of any power means and relying solely on gravity are provided for automatically maintaining the frame 16 of the machine in the desired, substantially horizontal position.

These means as shown in Figures 1–8 comprise a silage engaging travelling wheel or roller 45 independent of the propelling means 25 which is mounted in an inverted U-shaped yoke 46 secured to the outer end of a suitable lever 47 which may be in the form of an angle bar. The inner end portion of the lever 47 is pivotally attached by a pin or stud 48 to a suitable bracket 49 secured to the frame 16 as is best shown in Figure 6, it being noted that the position of the bracket 49 on the frame is such that the lever 47 extends laterally obliquely from the frame, substantially against the direction of travel 39.

An upright standard 50 is secured at its lower end to a suitable bracket 51 which is also secured to the frame 16 adjacent the bracket 49, and the upper end portion of the standard has welded or otherwise secured thereto a tubular, elongated bearing 52 which is disposed horizontally and at right angles to the axis of the frame 16.

As is best shown in Figure 4, the bearing 52 accommodates a rotatable shaft 53, one end portion of which is laterally angulated to form a crank 54 adjacent the standard 50, while the other end of the shaft 53 has secured thereto a downwardly extending arm 55. A washer 56 is provided on the shaft 53 between the crank 54 and the standard 50, as shown.

The lower end of the arm 55 has welded or otherwise secured thereto a frame-like platform 57 in which is removably positioned a suitable weight 58, such as for example, a container filled with concrete, a block of iron, a heavy stone, or the like. A pair of upwardly convergent braces 59 extend from the platform 57 to the arm 55 for purposes of reinforcement. As is best shown in Figure 7, the platform 57 may be constructed of angle bars, namely, a back bar 57a, a pair of side bars 57b having inwardly curved front end portions 57c, the horizontal flanges of these bars serving to supportably engage the weight 58 while the vertical flanges thereof prevent the weight from lateral sliding or shifting.

The crank 54 is provided with an aperture in which is disposed an eye-bolt 60, held in place by a nut 61, and an elongated flexible connecting element such as a length of chain 62 extends from this eye-bolt to the lever 47, to which it is fastened by a pin or bolt 63 at a point adjacent the pivot 48. Accordingly, an operative connection exists between the roller 45 and the weight 58, the proper relationship of which may be adjusted by simply turning the nut 61 on the eye-bolt 60.

It will be also noted that the parts are so arranged that the weight 58, responding to gravity, exerts a lifting force on the short end of the lever 47 whereby the roller 45 is urged in contact with the silage bed. When the device is in operation and the frame 16 assumes an out-of-horizontal position due to irregularities or unevenness of the silage bed, such as for example by slanting downwardly and outwardly toward the silo wall 23, the weight 58 will cause the arm 55 to move in the direction of the arrow 64 in Figure 2, thus urging the lever 47 downwardly as shown by the arrow 65. However, with the roller 45 engaging the silage, such downward movement of the lever 47 will be resisted and, as a result, the upward pulling action of the chain 62 on the lever 47 will impart a lifting force to the frame, tending to restore the same to the horizontal position which it will eventually assume as the machine continues to travel along its path.

Conversely, if the frame were to become slanted in the opposite direction, that is, toward the housing 18, the chain 60 would become slack, thus permitting the lever 47 with the roller 45 to swing upwardly and producing a tendency for the outer end portion of the frame adjacent the silo wall 23 to become lowered, thus again restoring the frame to its normal horizontal plane.

The accompanying Figures 9–12 illustrate the same machine equipped with a modified form of the self-leveling means, the same in this instance comprising a weight 70 mounted in a pendulum-like manner at the lower end of a swingable arm 71 which is pivotally attached by a bolt or pin 72 to the upper end of an upright standard 73. The latter is secured to the frame 16 adjacent the housing 18.

The aforementioned roller 40 and its supporting bracket or yoke 41 in this instance are substituted by a roller 74 mounted in a yoke 75 which, in turn, has secured thereto a vertical stem 76 slidable in a tubular guide or bearing 77. The guide 77 is rigidly secured to the frame 16 by a bracket 78 and is also provided with a lateral extension 79 having a double-arm lever 80 pivoted thereto by a suitable pin 81. One arm 80a of this lever abuts the upper end of the stem 76, while the other arm 80b is operatively connected by a flexible element such as a cable 82 to the arm 71 at a point adjacent the pivot 72.

If the frame 16 should become slanted toward the silo wall 23, that is, if the end portion of the frame carrying the housing 18 should become raised, the pendulum arm 71 would move in the direction of the arrow 83 in Figure 9, the cable 82 would become slack, thus permitting the roller 74 to rise and correspondingly permitting the frame adjacent the roller to drop to reinstate itself in a horizontal position.

On the other hand, if the frame were to become slanted in the direction of the housing 18, the pendulum arm 71 would swing in the direction of the arrow 84 and the pulling action of the cable 82 on the lever 80 would cause the stem 76 to slide downwardly in the guide 77, thus correspondingly raising the adjacent end of the frame to the horizontal plane.

Since it is not necesary for the roller 74 to swivel about the axis of the stem 76, the stem may be locked against rotation in the guide 77 by any suitable means, such as for example are shown in Figure 12, wherein the stem is provided with a longitudinally extending groove 85 slidably receiving a stud 86 in the guide 77. Thus, the stem 76 may be slidably but non-rotatably disposed in the guide.

While in the foregoing there have been shown and described the preferred embodiments of the invention, various modifications may become apparent to those skilled in the art to which the invention relates. Accordingly, it is not desired to limit the invention to this disclosure, and various modifications may be resorted to, such as may lie within the spirit and scope of the appended claims.

What is claimed as new is:

1. In a silage handling machine, the combination of a normally horizontally disposed elongated travelling frame having means for supporting the same on a bed of silage, silage pick-up and conveying means provided on said frame, and self-leveling means for sustaining the frame in a normal horizontal position, said last mentioned means comprising a lever pivoted adjacent one end thereof to said frame, a yoke provided at the other end of said lever, a silage engaging travelling wheel mounted in said yoke, a standard provided on the frame and formed at its upper end with a horizontal bearing, a shaft journalled in said bearing, a downwardly extending arm secured to said shaft, a gravity actuated weight provided at the lower end of said arm, a crank provided on said shaft, and a connecting element extending from said crank to said lever.

2. In a silage handling machine, the combination of a normally horizontally disposed elongated travelling frame having means for supporting the same on a bed of silage, silage pick-up and conveying means provided on said frame, and self-leveling means for sustaining the frame in a normal horizontal position, said last mentioned means comprising a vertically elongated guide provided on the frame, a stem slidable in said guide, a yoke provided at the lower end of said stem, a silage engaging travelling wheel mounted in said yoke, a lever pivoted to said guide and operatively engaging the upper end of said stem, a standard provided on said frame, an arm pivotally mounted on said standard, a gravity actuated weight carried by said arm, and means operatively connecting said arm to said lever.

3. In a silage handling machine, the combination of a normally horizontally disposed elongated travelling rigid frame, means including a member vertically adjustable relative to the frame for supporting said frame on a bed of silage, silage pick-up and conveying means provided on the frame in constant angular relation to the frame, and means responsive to inclination of the frame for automatically levelling the same to its normal horizontal position, said last mentioned means including a freely swingable gravity actuated weight mounted on the frame for movement under gravity relative thereto when the frame becomes inclined, and means independent of any power means operatively connecting said weight to said vertically adjustable member to raise or lower the same relative to the frame in response to the gravitational movement of said weight.

4. In a silage handling machine, the combination of a normally horizontally disposed elongated travelling rigid frame, means including a member vertically adjustable relative to the frame for supporting said frame on a bed of silage, silage pick-up and conveying means provided on the frame in fixed relation to the frame, and means responsive to inclination of the frame for automatically levelling the same to its normal horizontal position, said last mentioned means including a freely swingable weighted pendulum pivotally mounted on the frame for movement under gravity relative thereto when the frame becomes inclined, and means independent of any power means operatively connecting said pendulum to said vertically adjustable member to raise or lower the same relative to said frame in response to the gravitational movement of said pendulum.

5. In a silage handling machine, the combination of a normally horizontally disposed elongated travelling frame, means including a vertically adjustable member for supporting said frame on a bed of silage, silage pick-up and conveying means provided on the frame, and means responsive to inclination of the frame for automatically levelling the same to its normal horizontal position, said last mentioned means including a weighted pendulum pivotally mounted on the frame for movement under gravity relative thereto when the frame becomes inclined, and means including a flexible element operatively connecting said pnedulum to said vertically adjustable member for adjusting the same in response to the movement of the pendulum.

6. In a silage handling machine, the combination of a normally horizontally disposed travelling rigid frame, means including a travelling wheel vertically adjustable relative to the frame for supporting said frame on a bed of silage, silage pick-up and conveying means provided on the frame in constant angular relation to the frame, and means responsive to inclination of the frame for automatically levelling the same to its normal horizontal position, said last mentioned means including a freely swingable gravity acutated weight mounted on the frame for movement under gravity relative thereto when the frame becomes inclined, and means independent of any power means operatively connecting said weight to said wheel to raise or lower the same relative to the frame in response to the gravitational movement of said weight.

7. In a silage handling machine, the combination of a normally horizontally disposed elongated travelling rigid frame, means for supporting said frame on a bed of silage, said supporting means including a silage engaging travelling wheel adjustably mounted on said frame for raising and lowering movement relative thereto, silage pick-up and conveying means provided on the frame in fixed relation to the frame, and means responsive to inclination of the frame for automatically levelling the same to its normal horizontal position, said last mentioned means including a lever pivoted to the frame and operatively connected to said wheel, a freely swingable gravity actuated weight mounted on the frame for movement under gravity relative thereto when the frame becomes inclined, and means independent of any power means operatively connecting said weight to said lever, whereby to raise and lower said wheel relative to the frame in response to the gravitational movement of said weight.

8. In a silage handling machine, the combination of a normally horizontally disposed elongated travelling rigid frame, means for supporting said frame on a bed of silage, said supporting means including a lever pivoted to the frame for raising and lowering movement relative thereto, and a silage engaging travelling wheel carried by said lever, silage pick-up and conveying means provided on said frame in fixed relation to said frame, and means responsive to inclination of the frame for automatically levelling the same to its normal horizontal position, said last mentioned means including a standard provided on the frame, an arm pivoted to said standard for free swinging movement in a vertical plane, a gravity actuated weight carried by said arm for moving the latter under gravity relative to the frame when the frame becomes inclined, and means independent of any power means operatively connecting said arm to said lever whereby to raise and lower said wheel relative to the frame in response to gravitational movement of said weight.

9. In a self-levelling silage handling machine, the combination of a normally horizontally disposed travelling frame, means including a vertically adjustable travelling wheel for supporting said frame on a bed of silage, silage pick-up and conveying means provided on said frame, and means responsive to inclination of the frame for automatically levelling the same to its normal horizontal position, said last mentioned means comprising a standard provided on the frame, an arm pivoted to said standard for movement in a vertical plane, a weight carried by said arm for moving the latter under gravity relative to the frame when the frame becomes inclined, an elongated flexible element connected at one end thereof to said arm, and means operatively connecting the other end of said flexible element to said wheel for raising and lowering the latter in response to the movement of said weight.

10. In a self-levelling silage handling machine, the combination of a normally horizontally disposed travelling frame, means for supporting said frame on a bed of silage, said supporting means including a silage engaging travelling wheel mounted on said frame for raising and lowering movement relative thereto, silage pick-up and conveying means provided on the frame, and means responsive to inclination of the frame for automatically levelling the same to its normal horizontal position, said last mentioned means including an upright standard provided on the frame, an arm pivoted at its upper end to said standard for movement in a vertical plane, a weight carried by the lower end of said arm for moving the latter under gravity relative to the frame when the frame becomes inclined, a lever pivoted to the frame and operatively connected to said wheel for raising and lowering the same, and an elongated flexible element connected at one end thereof to the upper end of said arm and connected at its other end to said lever, whereby to raise and lower said wheel in response to the movement of said weight.

References Cited in the file of this patent

UNITED STATES PATENTS

| | | |
|---|---|---|
| 328,273 | Baker | Oct. 13, 1885 |
| 2,651,438 | Peterson | Sept. 8, 1953 |
| 2,663,594 | Dennick | Dec. 22, 1953 |
| 2,671,696 | McLean | Mar. 9, 1954 |
| 2,788,247 | Chapman | Apr. 9, 1957 |